(12) United States Patent
Alasti et al.

(10) Patent No.: US 11,882,549 B2
(45) Date of Patent: *Jan. 23, 2024

(54) COEXISTENCE OF MULTIPLE AIR INTERFACE SIDE-LINKS ON A CHANNEL

(71) Applicant: DISH Wireless L.L.C., Littleton, CO (US)

(72) Inventors: Mehdi Alasti, Reston, VA (US); Mariam Sorond, Reston, VA (US); Siddhartha Chenumolu, Broadlands, VA (US)

(73) Assignee: DISH Wireless L.L.C., Littleton, CO (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/570,832

(22) Filed: Jan. 7, 2022

(65) Prior Publication Data

US 2022/0132483 A1 Apr. 28, 2022

Related U.S. Application Data

(63) Continuation of application No. 16/860,705, filed on Apr. 28, 2020, now Pat. No. 11,252,719, which is a continuation of application No. 16/277,184, filed on Feb. 15, 2019, now Pat. No. 10,681,691.

(51) Int. Cl.
| | |
|---|---|
| *H04W 4/40* | (2018.01) |
| *H04W 72/044* | (2023.01) |
| *H04W 28/02* | (2009.01) |
| *H04W 84/00* | (2009.01) |
| *H04W 84/04* | (2009.01) |

(52) U.S. Cl.
CPC .......... *H04W 72/044* (2013.01); *H04W 4/40* (2018.02); *H04W 28/0205* (2013.01); *H04W 84/005* (2013.01); *H04W 84/042* (2013.01)

(58) Field of Classification Search
CPC . H04W 72/044; H04W 4/40; H04W 28/0205; H04W 84/005; H04W 84/042; H04W 76/14; H04W 72/1215
See application file for complete search history.

(56) References Cited

U.S. PATENT DOCUMENTS

| | | |
|---|---|---|
| 2018/0020365 A1 | 1/2018 | Xiong et al. |
| 2018/0048435 A1 | 2/2018 | Islam et al. |
| 2018/0206140 A1 | 7/2018 | Panteleev et al. |
| 2018/0206260 A1 | 7/2018 | Khoryaev et al. |
| 2018/0288589 A1 | 10/2018 | Punithan et al. |
| 2019/0173612 A1 | 6/2019 | Kimura et al. |

(Continued)

OTHER PUBLICATIONS

International Search Report and Written Opinion for PCT/US2020/016506, all pages.

(Continued)

*Primary Examiner* — Chuong A Ngo
(74) *Attorney, Agent, or Firm* — Kilpatrick Townsend & Stockton LLP (57) ABSTRACT

Various arrangements for using multiple air interfaces on a frequency channel for side-link communications are presented. Side-link communications may be performed using the first air interface during only a first time-window of a system resource pool while side-link communications may be performed using a second air interface during a second time-window of the system resource pool.

17 Claims, 5 Drawing Sheets

(56) References Cited

U.S. PATENT DOCUMENTS

| | | | |
|---|---|---|---|
| 2019/0274121 A1* | 9/2019 | Wu | H04W 72/23 |
| 2019/0312621 A1 | 10/2019 | Nam et al. | |
| 2020/0107299 A1 | 4/2020 | Zhou et al. | |
| 2020/0236173 A1 | 7/2020 | Ananda et al. | |
| 2020/0404700 A1 | 12/2020 | Li et al. | |
| 2021/0051627 A1 | 2/2021 | Lee et al. | |
| 2021/0058207 A1 | 2/2021 | Lee et al. | |
| 2021/0076236 A1 | 3/2021 | Kimura | |
| 2021/0219268 A1 | 7/2021 | Li et al. | |
| 2021/0235471 A1 | 7/2021 | Osawa et al. | |
| 2021/0307024 A1 | 9/2021 | Baldemair et al. | |

OTHER PUBLICATIONS

International Preliminary Report on Patentability for PCT/US2020/016506 dated Aug. 10, 2021, all pages.
International Search Report and Written Opinion for PCT/US2020/016582, all pages.
International Preliminary Report on Patentability for PCT/US2020/016582 dated Aug. 10, 2021, all pages.
LG Electronics Inc .: "Summary of Offline Discussion: WF for "Study on NR V2X" in RAN3", 3GPP Draft; R3-187223 Summary of Offline Discussion_WF for Study on NR V2X in RAN3_VO, $3^{rd}$ Generation Partnership Project (3GPP), Mobile Competence Centre; 650, Route des Lucioles; F-06921 Sophia-An, vol. RAN WG3, No. Spokane, USA; Nov. 12, 2018-Nov. 16, 2018 Nov. 20, 2018, XP051495607, Retrieved from the Internet: URL: http://www.3gpp.org/ftp/tsg%5Fran/WG3%5Flu/TSGR%5F102/Docs/R3%20187223%2Ezip [Retrieved on Nov. 20, 2018] Section 2.
NTT Docomo et al.: "Discussion on Inter-cell and Inter-carrier D2D", 3GPP Draft; R1-142270 Discussion On Inter-Cell Inter-Carrier D2D, $3^{rd}$ Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014 May 18, 2014, XP050787864, Retrieved from the Internet: URL: http://www.3gpp.org/ftp/Meetings_3GPP_SYNC/RAN1/Docs/ [retrieved on May 18, 2014] Section 3.
Intel Corporation: "In-device Coexistence Mechanisms for NR V2X Communication", 3GPP Draft; R1-1900488 Intel—EV2X_COEX, $3^{rd}$ Generation Partnership Project (3GPP), Mobile Competence Centre; 650, Route Des Lucioles; F-06921 Sophia-Antipolis Cedex; France, vol. RAN WG1, No. Taipei, Taiwan; Jan. 21, 2019-Jan. 25, 2019 Jan. 20, 2019, XP051593401, Retrieved from the Internet; URL: http://www.3gpp.org/ftp/Meetings%5F3gpP%5FSYNC/RAN1/Docs/R1%2D1900488%2Ezip [retrieved on Jan. 20, 2019] the whole document.
Huawei et al. "Sidelink physical layer structure for Nr V2X", 3GPP Draft; R1-1900022, $3^{rd}$ Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019 Jan. 20, 2019, XP051592948, Retrieved from the Internet: URL: http://www.3gppp.org/ftp/Meetings%5F3GP5FSYNC/RAN1/Docs/R1%2D1900022%2Ezip [retrieved on Jan. 20, 2019] sections 5 and 6; p. 4-p. 7; figures 3-6.

* cited by examiner

COEXISTENCE OF MULTIPLE AIR INTERFACE SIDE-LINKS ON A CHANNEL

CROSS-REFERENCES TO RELATED APPLICATIONS

This application is a continuation of U.S. patent application Ser. No. 16/860,705, filed Apr. 28, 2020, entitled "Coexistence Of Multiple Air Interface Side-Links On A Channel," which application is a continuation of U.S. patent application Ser. No. 16/277,184, filed Feb. 15, 2019, entitled "Coexistence Of Multiple Air Interface Side-Links On A Channel," now U.S. Pat. No. 10,681,691, issued Jun. 9, 2020, which application is related to U.S. patent application Ser. No. 16/277,116, filed Feb. 15, 2019, entitled "Coexistence Of Multiple Air Interface Side-Links On Adjacent Channels," the entire disclosures of which are hereby incorporated by reference in their entirety.

BACKGROUND

Typically, air interface communication protocols, such as 4G LTE and 5G NR are used to communicate between user equipment (UE) and a cellular network base station. However, side-link and device to device (or ProSe) communication is also possible. In side-link communications, vehicle UE communicates with another instance of vehicle UE, either directly or with the assistance of a base station. Similarly, other forms of UE can perform device to device (D2D) or ProSe communication directly or via a base station. Such direct communication may be useful if there is data that would be useful to transmit to particular instances of UE that are in the immediate vicinity of a transmitting UE.

While such side-link communications may be beneficial in certain instances, not all UE may use the same air interface communication protocol. Therefore, the ability of various instances of UE to coexist may result in significant inefficiencies, such as different frequency channels being needed to be allocated to each air interface.

SUMMARY

Various embodiments are described related to a method for using multiple air interfaces on a frequency channel for side-link communications. In some embodiments, a method for using multiple air interfaces on a frequency channel for side-link communications is described. The method may include determining, by an air interface coordination management server system, an allocation of a system resource pool among multiple different air interfaces such that a first air interface may be assigned a first time-window of a frequency channel of the system resource pool and a second air interface may be assigned a second time-window of the frequency channel of the system resource pool. The first time-window and the second time-window may not overlap. The method may include transmitting a first indication of the first time-window of the system resource pool to a first air interface system. The method may include transmitting a second indication of the second time-window of the system resource pool to a second air interface system. The method may include transmitting, by the first air interface system, a first indication of the first time-window of the system resource pool to a first set of user equipment using the first air interface. The method may include transmitting, by the second air interface system, a second indication of the second time-window of the system resource pool to a second set of user equipment using the second air interface. The method may include performing, by the first set of user equipment, side-link communications using the first air interface during only the first time-window of the system resource pool. The method may include performing, by the second set of user equipment, side-link communications using the second air interface during only the second time-window of the system resource pool.

Embodiments of such a method may include one or more of the following features: the first air interface may be a 4G LTE air interface. The second air interface may be a 5G NR air interface. The first air interface may use a first subcarrier spacing and the second air interface may use a second subcarrier spacing that may be different from the first subcarrier spacing. The side-link communications may be selected from a group consisting of vehicle to vehicle communications, vehicle to infrastructure communications, and vehicle to pedestrian communications. The side-link communications may include basic safety messages (BSMs). Each BSM may include: vehicle size data, position data, speed data, heading data, acceleration data, and brake system status data. The method may further include receiving, by the air interface coordination management server system, one or more reports of communication traffic on the first time-window, the second time-window, or both. The method may further include re-determining, by the air interface coordination management server system, the allocation of the system resource pool among multiple different air interfaces based on the one or more reports of communication traffic. The system resource pool may periodically repeat. The method may further include transmitting, by the second air interface system, an indication of a subcarrier spacing to be used during the second time-window of the system resource pool to the second set of user equipment using the second air interface. No indication of subcarrier spacing may be transmitted to the first set of user equipment using the first air interface. Subcarrier spacing of the second air interface may be variable but subcarrier spacing of the first air interface may be fixed.

In some embodiments, a system that uses multiple air interfaces on a frequency channel for side-link communications is described. The system may include an air interface coordination management server system that may determine an allocation of a system resource pool among multiple different air interfaces such that a first air interface may be assigned a first resource pool having a first time-window of a frequency channel and a second air interface may be assigned a second resource pool having a second time-window of the frequency channel. The system may include a first air interface system that may receive an indication of the first time-window from the air interface coordination management server system and may transmit the indication of the first time-window to a first plurality of user equipment that may communicate using the first air interface. The system may include a second air interface system that may receive an indication of the second time-window from the air interface coordination management server system and may transmit the indication of the second time-window to a second plurality of user equipment that may communicate using the second air interface. The system may include the first plurality of user equipment that may perform side-link communications using the first air interface during only the first time-window of the first resource pool. The system may include the second plurality of user equipment that may perform side-link communications using the second air interface during only the second time-window of the second resource pool.

Embodiments of such a system may include one or more of the following features: The first air interface may be a 4G LTE air interface. The second air interface may be a 5G NR air interface. The side-link communications may be selected from a group consisting of vehicle to vehicle communications, vehicle to infrastructure communications, and vehicle to pedestrian communications. The side-link communications may include basic safety messages (BSMs). Subcarrier spacing of the second air interface may be variable but subcarrier spacing of the first air interface may be fixed.

In some embodiments, a vehicle system that uses multiple air interfaces on a frequency channel for side-link communications is described. The system may include a first air interface component that may perform side-link communications using a first air interface. The system may include a second air interface component that may perform side-link communications using a second air interface. The system may include a vehicle systems interface. The system may include one or more processors configured to receive one or more resource pool allocation messages via the first air interface component, the second air interface component, or both. The one or more resource pool allocation messages may allocate a system resource pool among multiple different air interfaces such that the first air interface may be assigned a first resource pool having a first-time-window of a frequency channel and the second air interface may be assigned a second resource pool having second time-window of the frequency channel. The system may schedule a first side-link communication using the first air interface component and the first air interface during the first time-window on the frequency channel. The system may schedule a second side-link communication using the second air interface component and the second air interface during the second time-window on the frequency channel. The system may perform the first side-link communication during the first time-window on the frequency channel. The first side-link communication may use data obtained from the vehicle systems interface. The system may perform the second side-link communication during the second time-window on the frequency channel. The second side-link communication may use data obtained from the vehicle systems interface.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Various air interfaces describe the ability of UE to communicate using side-links. A side-link can refer to a direct wireless communication between two instances of vehicle UE with or without using a cellular network base station. Such a side-link may be autonomous (radio resources are chosen for the side-link communication without scheduling from the base-station), or scheduled by the base-station (the base-station assigns the resources for the communication and the UEs receive messages indicating as such). Vehicle communication systems may be built into a vehicle (e.g., car, truck, motorcycle, scooter, train, boat, tram, subway, etc.). Typically, such as defined by 3GPP, side-link communications refer to vehicle-to-vehicle (V2V) side-link communications; however, other forms of communication may also be considered a form of side-link communication, such as vehicle-to-infrastructure (V2I) side-link communications and vehicle-to-pedestrian (V2P) communications. Infrastructure UE may be installed at various pieces of infrastructure, such as brides, roadways, highways, traffic lights, buildings, parking facilities, etc. Pedestrian communication systems may include mobile devices, such as smartphones, that a pedestrian may carry on his body.

Such side-link communications may allow for safety information to be quickly and efficiently exchanged between UE located in the vicinity of each other. For example, side-link communications may typically be performed over distances of 1000 feet or less. Such side-link communications may involve basic safety messages (BSMs) being transmitted and received via side-link communications. BSMs may include data such as: a timestamp; position (latitude, longitude, elevation); speed; heading; acceleration; brake system status; vehicle size; steering wheel angle; positional accuracy; braking history; path prediction; throttle position; vehicle mass; trailer weight; vehicle type; vehicle description; anti-lock brake system (ABS) status; traction control status; stability control status; differential GPS; lights status; wiper status; brake level; coefficient of friction; rain type; air temperature; air pressure; vehicle identification; cargo weight; and GPS status. Such data may be transmitted via a side-link using an air interface to other instances of UE in the immediate vicinity.

In order to successfully communicate using a side-link communication, the same air interface needs to be used by the transmitting UE and the receiving UE. For example, side-link communications may use 4G LTE (Long Term Evolution) as the air interface communication protocol or may use 5G NR (New Radio) as the air interface communication protocol. An instance of user equipment may, for example, be able to communicate: using only 4G LTE; using only 5G NR; or using both air interface communication protocols. It can be expected that 5G NR UE will be compatible with 4G LTE. Other air interface communication protocols may also be possible.

Side-links performed using air interfaces that use different communication protocols (such as 4G LTE and 5G NR) may be performed using the same frequency channel. Since different air interface communication protocols are incompatible, interference is possible. For example, different air interface communication protocols may use different subcarrier spacing; thus, interference could result due to the lack of orthogonality if both air interfaces were used for communication on the same resource pool. As a specific example, 4G LTE only uses 15 KHz subcarrier spacing; however, 5G NR uses multiple different subcarrier spacings (15 KHz, 30 KHz, 60 KHz, etc.) to be used. However, multiple air interface communication protocols can share a same frequency channel for side-link communications as detailed herein by the frequency channel being subdivided based on time.

Figure 1:
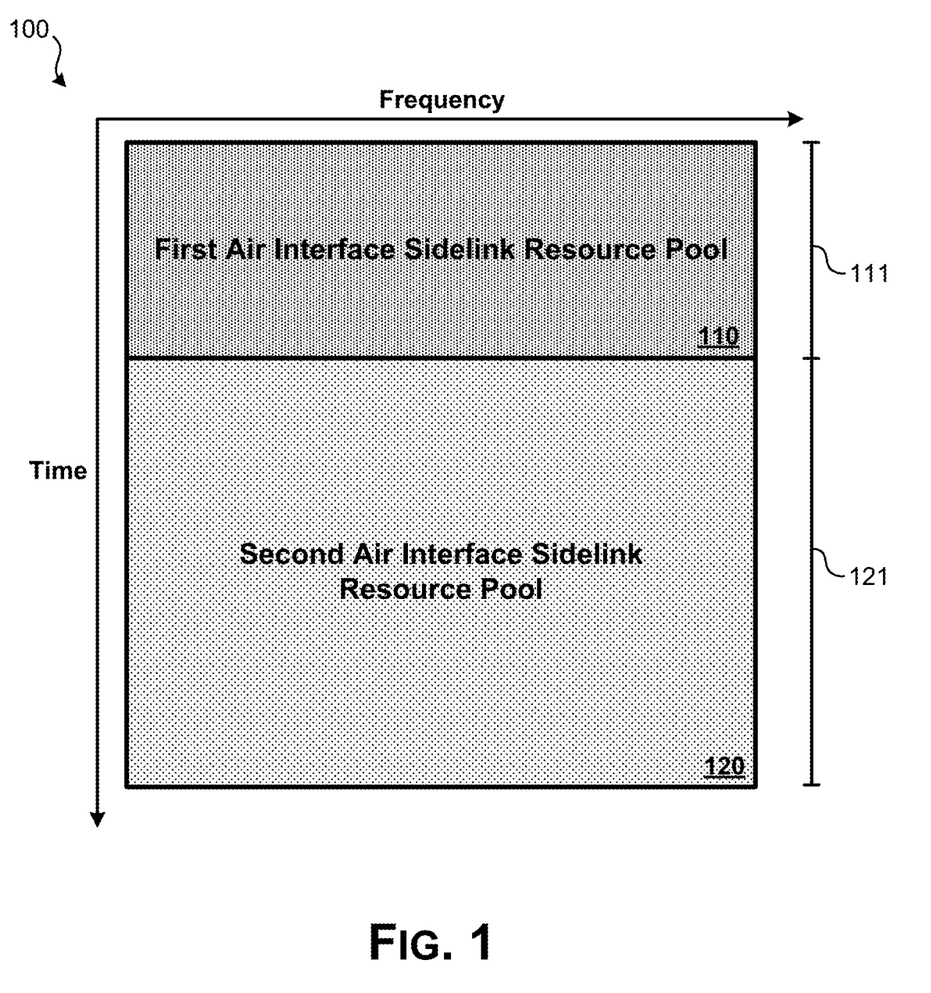
FIG. 1 illustrates multiple resource pools that are configured to allow for coexistence of multiple air interfaces on the same channel.

FIG. 1 illustrates multiple resource pools that are configured to allow for coexistence of multiple air interfaces on the same channel. A system resource pool 100 can be subdivided in the frequency domain into various subcarriers having various subcarrier spacings. System resource pool 100 may also be defined over a period of time. After the period of time, a new system resource pool may be present, allowing for periodic repetition of system resource pool 100.

System resource pool 100 is divided, based on time, into a first air interface side-link resource pool 110 and a second air interface side-link resource pool 120. For example, the first air interface may be 4G LTE and the second air interface may be 5G NR. First air interface side-link resource pool 110 and second air interface side-link resource pool 120 each include the entire frequency channel. First air interface side-link resource pool 110 occurs over first time period 111 and second air interface side-link resource pool 120 occurs over second time period 121. The first time period 111 and the second time period 121 can be adjacent, but do not overlap. The relative duration of first air interface side-link resource pool 110 and second air interface side-link resource pool 120 may be varied based on the measured or expected amount of traffic using each air interface communication protocol. As seen in FIG. 1, first time period 111 is shorter in duration than second time period 121. Therefore, it can be expected that fewer side-link communications using the first air interface have previously been present or are expected to be present than via the second air interface. In other embodiments, a predefined fixed allocation of system resource pool 100 may be performed between the first air interface and the second air interface.

Even though first air interface side-link resource pool 110 and second air interface side-link resource pool 120 are part of the same frequency channel, since time division of system resource pool 100 is used, different subcarrier spacing or the same subcarrier spacing may be used for each pool without interference. For example, if the first air interface is 4G LTE, the subcarrier spacing can only be at 15 kHz. If the second air interface is 5G NR, the subcarrier spacing may be set to either, for example, 15 kHz, 30 kHz, 60 kHz in a first frequency range (FR1) or 60 kHz or 120 kHz in a second frequency range (FR2). To change the subcarrier spacing, side-link resource pool 120 may need to be reconfigured.

Each instance of UE may receive data that indicates how system resource pool 100 is apportioned. Therefore, a UE can schedule side-link communications during first time period 111 if the first air interface is to be used or during second time period 121 if the second air interface is to be used. While the illustrated example illustrates system resource pool 100 being divided into more than two resource pools to accommodate more than two air interface communication protocols.

Figure 2:
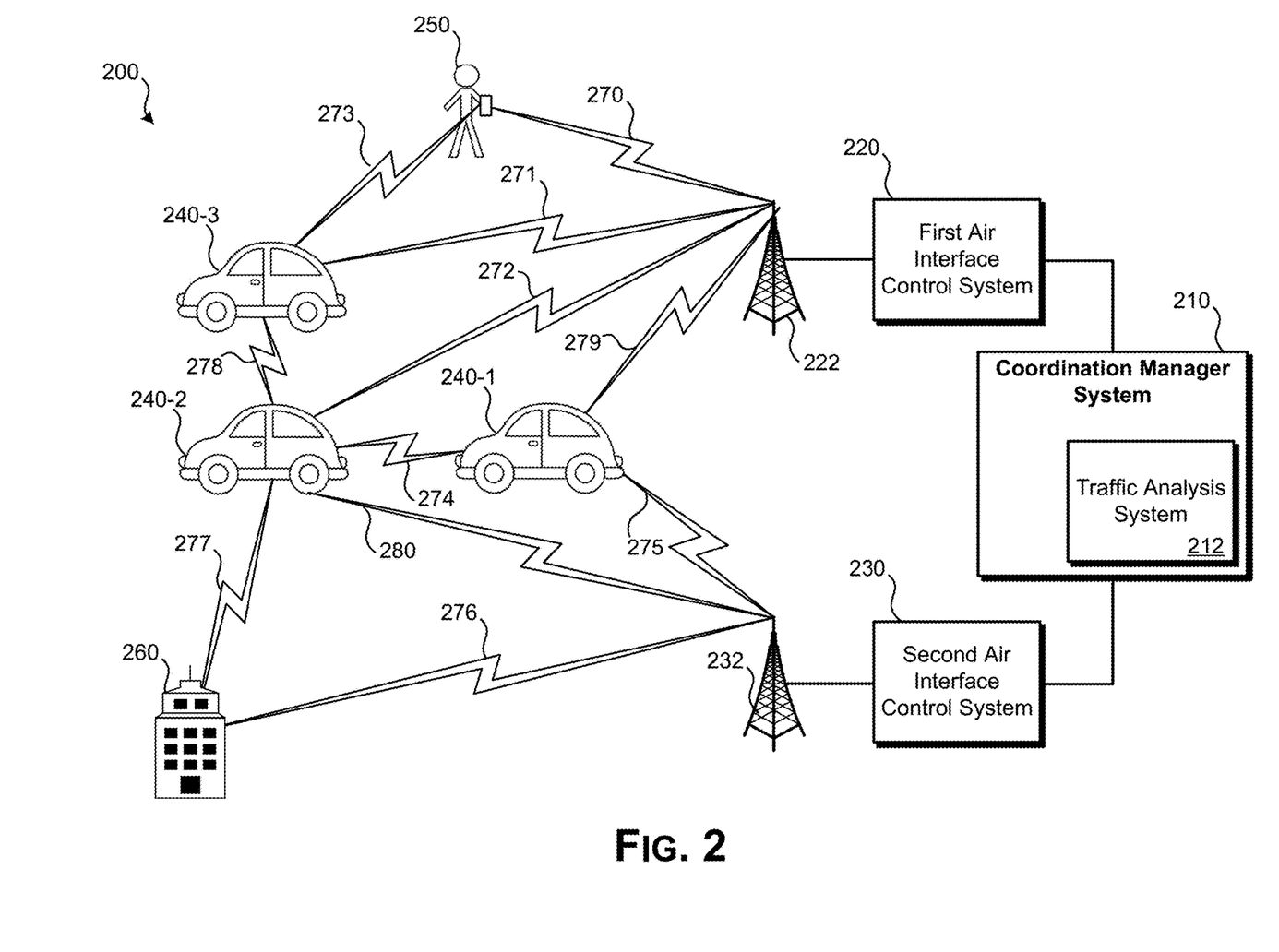
FIG. 2 illustrates a system that uses multiple air interfaces for side-link communications using a resource pool.

FIG. 2 illustrates a system 200 that uses multiple air interfaces for side-link communications using a resource pool. System 200 may include: coordination management system 210; first air interface control system 220; second air interface control system 230; base station 222; base station 232; pedestrian UE 250 (which is represented on FIG. 2 as a pedestrian holding a UE); vehicles 240 (240-1, 240-2, 240-3); and infrastructure 260.

Coordination manager system 210 can represent one or more server systems that can either statically, semi-statically or dynamically subdivide side-link resource pools (e.g., system resource pool 100) into one or more resource pools for different air interfaces. Coordination manager system 210 may be operated by a particular cellular network provider or may be used to coordinate resource pools across multiple cellular network service providers. If coordination manager system 210 is operated by a particular cellular network provider, it may be in communication with a master coordination system that communicates with coordination manager systems operated by multiple cellular network providers or coordination manager system 210 may communicate with coordination manager systems operated by other cellular service providers such that the side-link resource pools are divided consistently across service providers in a given geographic region (thus allowing for communication among UE of different service providers). Coordination manager system 210 may assign a portion of a resource pool to each air interface.

In some embodiments, a static amount of resource pool is assigned to each air interface. A static amount of resource pool may be assigned once and remain fixed. In a semi-static arrangement, the semi-static amount may be occasionally or periodically reassessed, such as daily or weekly. For example, half of a resource pool may be assigned to a first air interface and the second half of the resource pool may be assigned to the second air interface. In some embodiments, a dynamic amount of resource pool is assigned to each air interface. In such embodiments, coordination manager system 210 may have a traffic analysis system 212. Traffic analysis system 212, which may be special-purpose computer hardware or a software process executed by coordination manager system 210, may receive indications of side-link traffic. Based on analyzing the amount of side-link traffic or the amount of collisions in side-link traffic, coordination manager system 210 may adjust the allocation of the amount of resource pools that are assigned to each air interface. For example, if a large amount of side-link traffic is present using a first air interface but a relatively little amount of side-link traffic is present using a second air interface, allocation of resource pools may be adjusted such that the first air interface is allocated a greater portion of each resource pool. Such an adjustment may occur on a geographic basis; that is, certain geographic regions may see one air interface being allocated a greater portion of each resource pool while another geographic region may see a different air interface being allocated a greater portion of each resource pool.

Coordination manager system 210 may communicate with first air interface control system 220 and second air interface control system 230. First air interface control system 220 and second air interface control system 230 can represent control systems that are part of wireless networks that use different air interface communication protocols. By way of example, first air interface control system 220 may use 4G LTE as its air interface communication protocol and second air interface control system 230 may use 5G NR as its air interface communication protocol. First air interface control system 220 and second air interface control system 230 may receive indications of the time window of side-link resource pools that are allocated to the air interface used by the particular control system. The time window available for use for side-link communications for each particular air interface may be communicated by the control system, through a base station, to each instance of UE with which the base station is in communication. For example, first air interface control system 220 may transmit an indication of the time window of each resource pool during which side-link communication using the first air interface is permitted via base station 222 to instances of UE that communicate using the first air interface and are in communication with base station 222. Similarly, for example, second air interface control system 230 may transmit an indication of the time window of each resource pool during which side-link communication using the second air interface is permitted via base station 232 to instances of UE that communicate using the second air interface and are in communication with base station 232. In other embodiments, the indication may include more information, such as indicating the particular air interface that is allocated to each time window within each resource pool. Therefore, in such embodiments, a UE that communicates using multiple air interfaces could determine when it can transmit a side-link communication using the second air interface based on an indication received from first air interface control system 220 through base station 222.

In system 200, for example, the first air interface may be 4G LTE. In such an embodiment, base station 222 may be an eNodeB. First air interface control system 220 may be part of the enhanced packet core (EPC) of the 4G LTE network or may be incorporated as part of the eNodeB. The second air interface may be 5G NR. In such an embodiment, base station 232 may be a gNodeB. Second air interface control system 230 may be part of the core 5G network or may be incorporated as part of the gNodeB.

In system 200, pedestrian UE 250, vehicle 240-3, vehicle 240-2, and vehicle 240-1 communicate using the first air interface; vehicle 240-1, and infrastructure 260 communicate using the second air interface. Pedestrian UE 250 communicates with base station 222 via wireless link 270; vehicle 240-3 communicates with base station 222 via wireless link 271; vehicle 240-2 communicates with base station 222 via wireless link 272; and vehicle 240-1 communicates with base station 222 via wireless link 279. Vehicle 240-1 communicates with base station 232 via wireless link 275; vehicle 240-2 communicates with base station 232 via wireless link 280; and infrastructure 260 communicates with base station 232 via wireless link 276. In system 200, side-link communications may be in the form of broadcast messages or messages transmitted to specific other instance of UE in the vicinity. Various side-link communications are present: side-link 273 (which is vehicle-to-pedestrian); side-link 278 (which is vehicle-to-vehicle); and side-link 274 (which is vehicle-to-vehicle). In some embodiments, another form of direct or indirect communication may be present, such as side-link 277 (which is vehicle-to-infrastructure).

Side-link 273 may be performed using the first air interface using the portion of resources for side-links assigned to the first air interface, such as first air interface side-link resource pool 110. Side-link 278 may also be performed using the first air interface using the portion of the resources for side-links assigned to the first air interface. However, vehicle 240-2 may have UE that is also capable of communicating using the second air interface. Side-link 274 may be performed using the second air interface using the portion of resources for side-links assigned to the second air interface, such as second air interface side-link resource pool 120. Side-link 277 may also be performed using the second air interface using the portion of resources for side-links assigned to the second air interface. In some embodiments, data about side-link communications may be reported back to first air interface control system 220, second air interface control system 230, or both. Such data about side-link communications may indicate: 1) that such side-link transmissions have occurred; and/or 2) that side-link transmission collisions occurred. Such data may be reported back to coordination manager system 210 for use by traffic analysis system 212.

Figure 3:
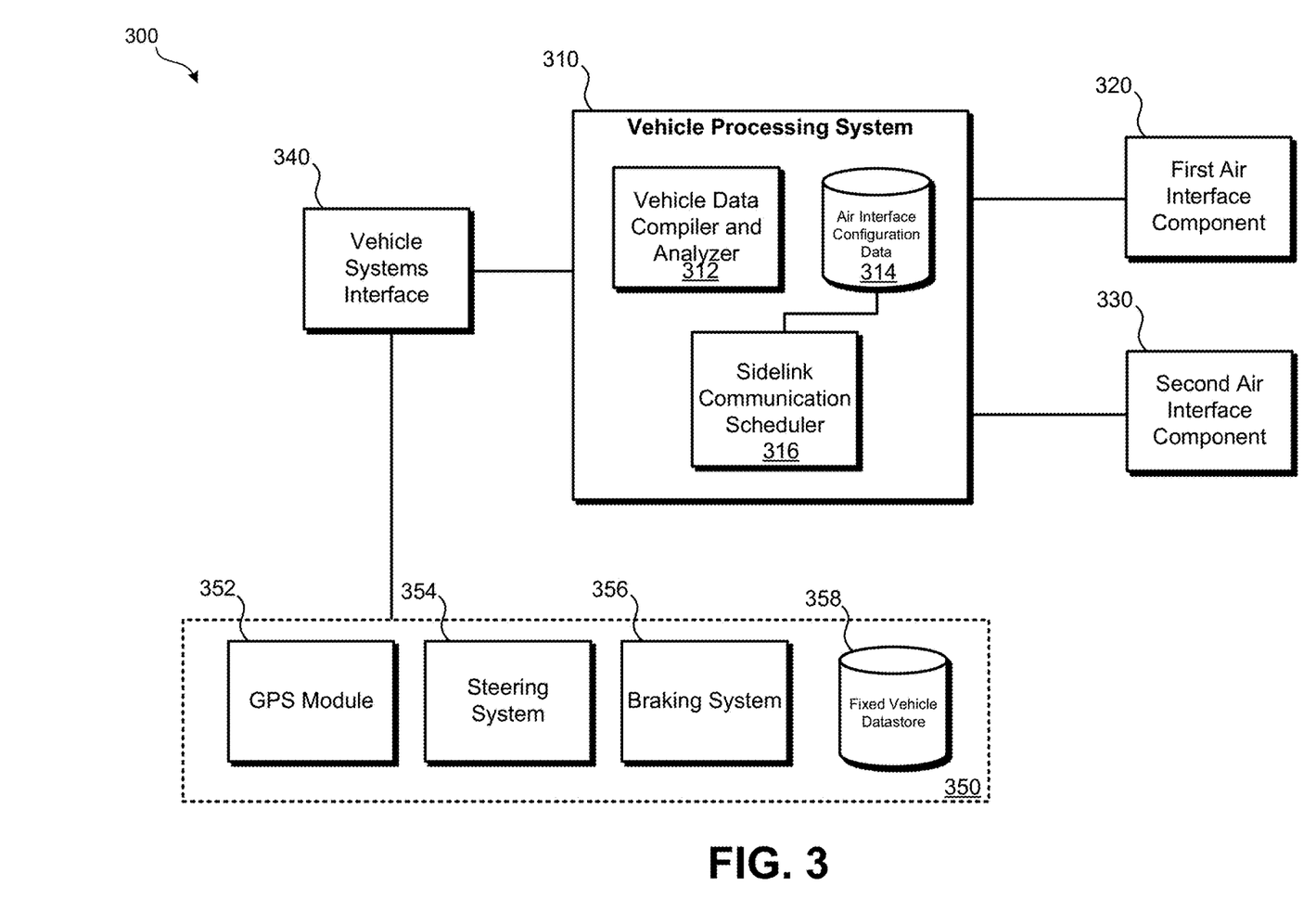
FIG. 3 illustrates an embodiment of a vehicle system that can communicate using multiple air interfaces using a same resource pool.

FIG. 3 illustrates an embodiment of a vehicle system 300 that can communicate using multiple air interfaces using a same resource for side-links. An embodiment of vehicle system 300 may be present on vehicle 240-1 and 240-2. On vehicle 240-3, an embodiment of vehicle system 300 may present that does not include second air interface component 330. Vehicle system 300 can include: vehicle processing system 310; first air interface component 320; second air interface component 330; vehicle systems interface 340; and vehicle systems 350 (which can include GPS module 352, steering system 354, braking system 356, and fixed vehicle datastore 358).

Vehicle processing system 310 may include one or more special-purpose or general-purpose processors. Such special-purpose processors may include processors that are specifically designed to perform the functions detailed herein. Such special-purpose processors may be ASICs (application-specific integrated circuits) or FPGAs (field-programmable gate arrays) which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The various components of vehicle processing system 310 may be implemented using such special- or general-purpose processors.

Vehicle processing system 310 may be in communication with first air interface component 320, second air interface component 330, or both. First air interface component 320 may transmit and receive data with a cellular network that uses the first air interface and may perform side-link communications with other instances of UE that communicate using the first air interface. Second air interface component 330 may transmit and receive data with a cellular network that uses the second air interface and may perform side-link communications with other instances of UE that communicate using the second air interface. In some examples, first air interface component 320 communicates using 4G LTE and second air interface component communicates using 5G LTE. It should be understood that in other embodiments a greater number (or fewer number) of air interface components may be present.

Vehicle processing system 310 may store side-link resource pool allocation data received via first air interface component 320, second air interface component 330, or both in air interface configuration data 314. This data may be accessed by side-link communication scheduler 316 to determine which portion of a resource pool has been allocated for side-link communications in the air interface that is to be used for the side-link communication. Side-link communication scheduler 316 may cause the side-link communication to be transmitted as one or more packets during one or more appropriate sub-pools across one or more side-link communication resource pools.

Vehicle data compiler and analyzer 312 may: 1) receive and format data obtained from vehicle systems interface 340 for transmission in the form of one or more messages, such as BSMs; and 2) interpret messages, such as BSMs, received from other instances of UE via side-link communications. Vehicle systems interface 340 may collect data from various vehicle systems 350. For example, such vehicle systems can include: GPS module 352 (e.g., location, elevation, position accuracy); steering system 354 (e.g., steering angle); braking system 356 (e.g., whether or not engaged, amount of braking); and fixed vehicle datastore 358 (e.g., data about the vehicle that does not regularly change, such as vehicle type, vehicle description, etc.). In some embodiments, vehicle systems 350 may communicate directly with vehicle processing system 310. In other embodiments, other vehicle systems may provide data for inclusion in BSMs or other forms of data transmissions via side-links.

BSMs or other types of messages may be broadcast via side-link communications or may be transmitted to particular other instances of UE. In a broadcast form, any instance of UE in the vicinity (within reception range) that communicates using the air interface used to transmit the side-link communication may be able to receive the side-link communication to determine where the instance of UE is located. In an embodiment such as illustrated of vehicle system 300, both first air interface component 320 and second air interface component 330 may be used to transmit similar data as side-link communications using different air interfaces and the assigned sub-pools of resource pools.

Similar systems to vehicle system 300 may be present in pedestrian UE and infrastructure UE to transmit via side-link transmissions the position and state of the instance of UE and to receive and analyze side-link communications received from other instances of UE.

Figure 4:
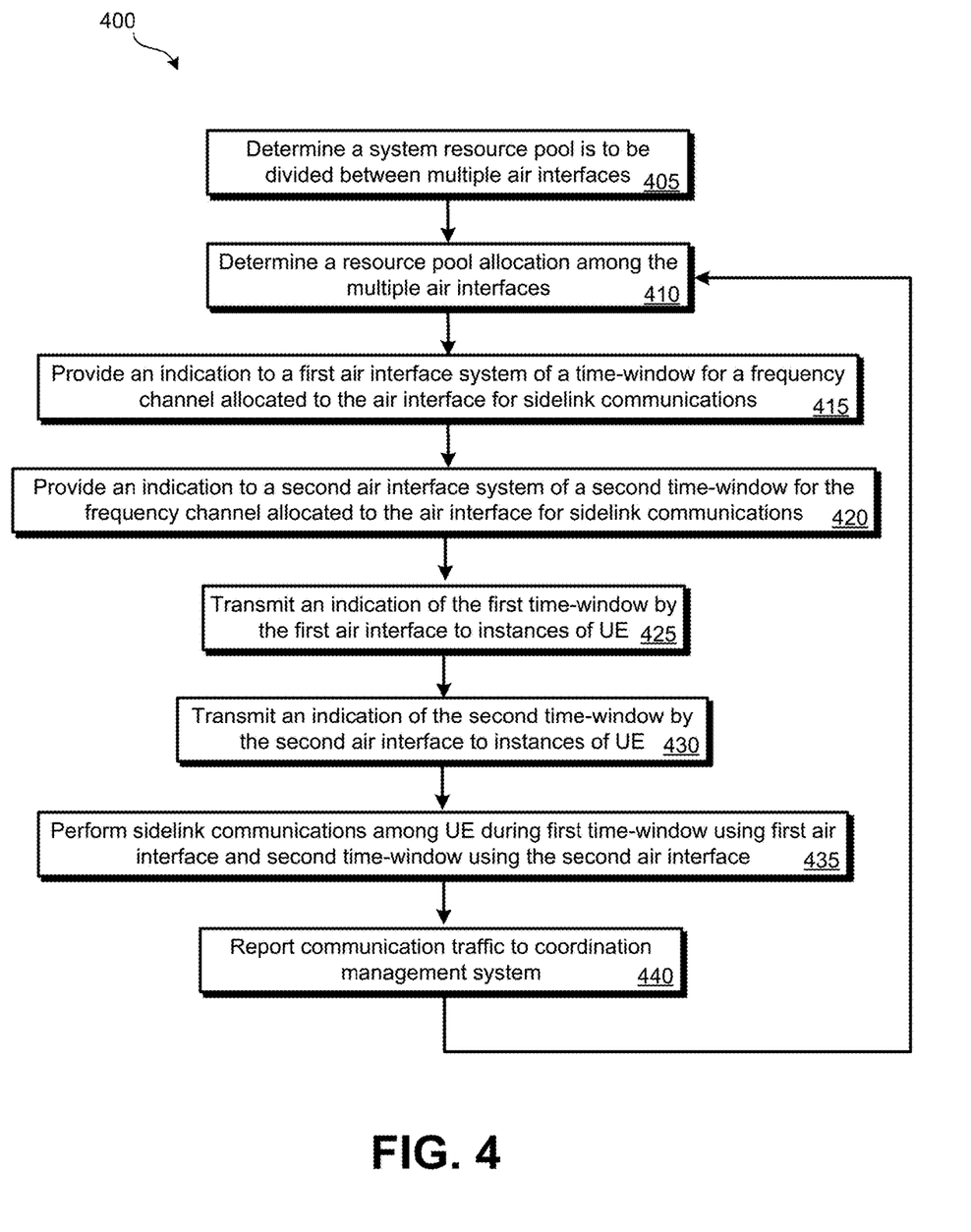
FIG. 4 illustrates an embodiment of a method for using multiple air interfaces on a same resource pool for side-link communications.

Various methods may be performed using the systems detailed in FIGS. 2 and 3 and the resource pool allocation detailed in relation to FIG. 1. FIG. 4 illustrates an embodiment of a method 400 for using multiple air interfaces on a same resource pool for side-link communications. Method 400 may be performed using at least some components of system 200 of FIG. 2. In other embodiments, method 400 may be performed using a system other than system 200 of FIG. 2.

At block 405, a determination that a system resource pool is to be divided up between multiple air interfaces may be made. In some embodiments, this determination may not be necessary because the resource pools are always allocated among multiple air interfaces. In other embodiments, a system, such as a coordination manager system, may determine that based on various parameters, such as the instances of user equipment in a particular region, that resource pools available for site links are to be allocated among multiple air interfaces. While more than two air interfaces may be used in conjunction with a resource pool for single frequency channel, the remainder of the example of method 400 assumes that the resource pool is being allocated for two air interfaces. For example, the first air interface may be 4G LTE and the secondary interface may be 5G NR.

At block 410, a determination may be made about how resource pools are to be allocated among multiple air interfaces. The allocation may be based on a time window of the entire frequency channel of the resource pool being assigned to each air interface. Therefore, the greater the percent that the time window is of the entire resource pool, the greater the available bandwidth for transmitting side-link messages using the associated air interface. The determination of block 410 may be performed by a coordination manager system. The determination may be based on the determined or expected amount of side-link traffic using each air interface among which the system resource pool is being allocated.

At block 415, an indication may be provided to a first air interface system of a time-window for side-link resource pools that has been allocated to the first air interface. The indication may indicate a start time and end time of the time-window of each resource pool. Similarly, at block 420, an indication may be provided to a second air interface system of a second, non-overlapping time-window for side-link resource pools that has been allocated to the second air interface. The indication may indicate a start time and end time of the second time-window of each resource pool. These indications may be provided by the coordination manager system. The duration of each time-window may be based on the determination of block 410.

At block 425, an indication of the first time-window of the resource pools that are allocated for side-link transmissions using the first air interface may be transmitted to UE that is communicating with the first air interface system. Such an indication may be transmitted in only a particular geographic region or in certain cells of the cellular network. In response to the indication, each UE which receives the message may update stored air interface configuration data that is stored locally. In an example in which the first air interface is 4G LTE, no indication of a subcarrier spacing may be transmitted since subcarrier spacing for side-link communications may be fixed. At block 430, an indication of the second time-window of the resource pools that are allocated for side-link transmissions using the second air interface may be transmitted to UE that is communicating with the second air interface system. Such an indication may be transmitted in only a particular geographic region or in certain cells of the cellular network. In response to the indication, each UE which receives the message may update stored air interface configuration data that is stored locally. In an example in which the second air interface is 5G NR, an indication of subcarrier spacing may also be transmitted since subcarrier spacing for 5G NR side-link communications may be variable based on the network configuration. Therefore, the subcarrier spacing of the second pool may differ At block 435, side-link communications may be performed directly between UE using the first time-window for the first air interface and the second time-window for the second air interface. By using different time-windows of each resource pool, different air interfaces can use the same frequency channel. Side-link communications may be sent in the form of a broadcast message that can be received directly by multiple instances of UE located within communication range or may be sent as a message addressed to a particular instance of UE. At block 440, in some embodiments, side-link communication messages or collisions may be reported back via the first air interface system, the second air interface system, or both such that the allocation of the resource pool can be adjusted to better accommodate the side-link communication traffic.

Figure 5:
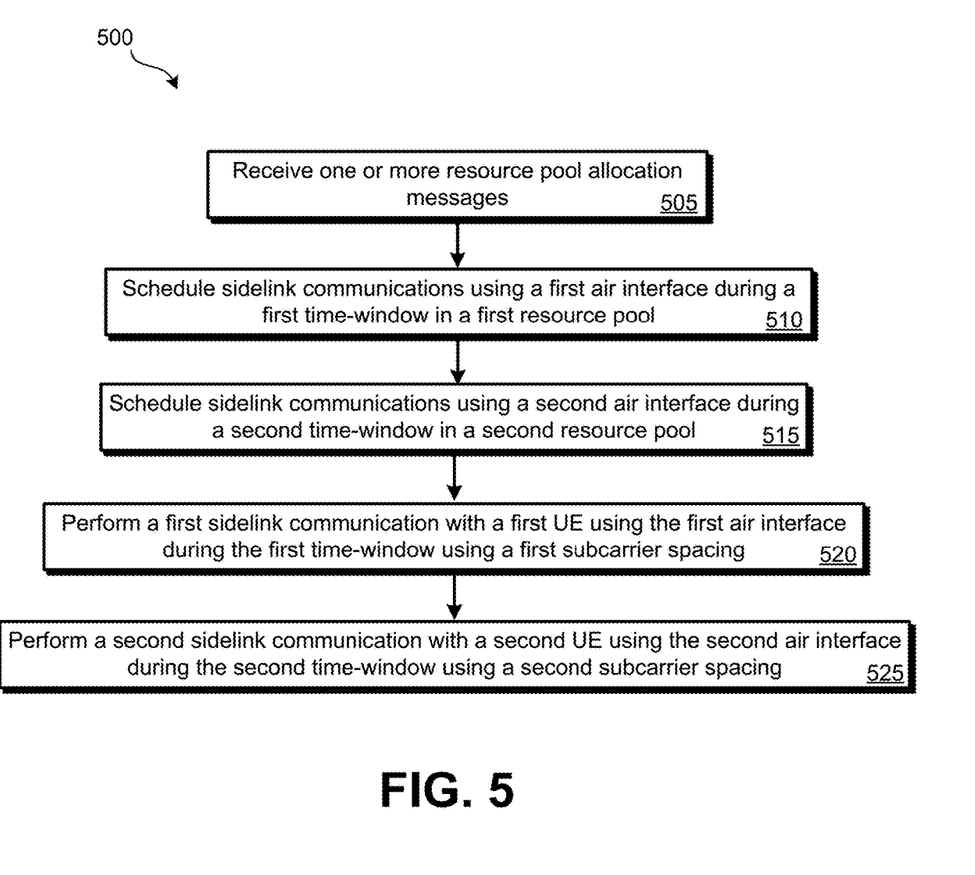
FIG. 5 illustrates an embodiment of a method for a vehicle system using multiple air interfaces on a same resource pool for side-link communications.

While method 400 is focused on actions that are taken at a system level, method 500 is focused on actions performed by an instance of UE, such as a vehicle-based system. FIG. 5 illustrates an embodiment of a method 500 for a vehicle system using multiple air interfaces on a same resource pool for side-link communications. Method 500 may be performed using vehicle system 300. Method 500 may alternatively be performed using some alternate form of UE.

At block 505, an instance of UE may receive one or more resource pool allocation messages. A resource pool allocation message may indicate a time window within side-link system resource pools allocated to the air interface particular corresponding to the air interface system from which the message was received. Alternatively, the resource pool allocation message may indicate how the resource pool is allocated as a whole. (Thus, it may be possible for an instance of UE to receive a resource pool message via a first air interface and send a side-link communication using a second air interface during the correct pool assigned to the second air interface.)

At block 510, based on the received one or more resource pool allocation messages, a side-link communication message may be scheduled for transmission using the first air interface during a first time-window or first resource pool assigned to the first air interface. Similarly, if the UE also has an air interface component that communicates using the second air interface, At block 515, based on the received one or more resource pool allocation messages, a different side-link communication message may be scheduled for transmission using the second air interface during a second time-window or second resource pool assigned to the second air interface. Therefore, while the first side-link message and the second side-link message may contain the same or similar data, they may be sent using different protocols and carrier spacing during the appropriate assigned resource pool time-windows. At block 520 and 525, the first side-link communication and the second side-link communication may be transmitted. At block 520, the first side-link communication may be transmitted using the first air interface to a first UE using a first subcarrier spacing during the first time-window. At block 525, the second side-link communication may be transmitted using the second air interface to a second UE using a second subcarrier spacing during the second time-window.

While method 500 is directed to transmitting side-link messages, a similar scheduled arrangement can also be used for receiving side-link messages. That is, during the pool or time-window assigned to the first air interface, side-link messages in the first air interface communication protocol are listened for and received on the frequency channel; and during the second pool or second time-window assigned to the second air interface, side-link messages in the second air interface communication protocol are listened for and received on the frequency channel.

In the example of method 500, the UE communicates using both air interfaces. If UE uses the second air interface, it may be backwards compatible to use the first air interface. In other embodiments, some instances of UE may exclusively use the first air interface or the second air interface. In other embodiments, a greater number of air interfaces may be used and the resource pool may be further subdivided to accommodate more than two air interfaces.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A vehicle system that uses multiple air interfaces for side-link communications, the vehicle system comprising:
   a first air interface component that performs side-link communications using a first air interface;
   a second air interface component that performs side-link communications using a second air interface;
   one or more processors, configured to:
   schedule a first side-link communication using the first air interface component and the first air interface during a first time-window on a frequency channel, wherein:
   a system resource pool is allocated among multiple different air interfaces such that the first air interface is assigned a first resource pool having the first time-window of the frequency channel;
   the second air interface has a second resource pool having second time-window of the frequency channel; and
   the first resource pool and the second resource pool being part of the system resource pool; and
   cause the first air interface component to perform the scheduled first side-link communication during the first time-window on the frequency channel, wherein the first side-link communication comprises a basic safety message (BSM) that comprises one or more categories of data selected from the group consisting of: vehicle size data, position data, speed data, heading data, acceleration data, and brake system status data.

2. The vehicle system of claim 1, wherein the one or more processors is further configured to receive a resource pool allocation message that defines the first time-window and the second time-window.

3. The vehicle system of claim 1, further comprising a vehicle system interface, wherein vehicle data for the BSM is obtained by the one or more processors from the vehicle systems interface.

4. The vehicle system of claim 1, wherein the one or more processors is further configured to schedule a second side-link communication using the second air interface component and the second air interface during the second time-window on the frequency channel.

5. The vehicle system of claim 4, wherein the one or more processors is further configured to cause the second air interface component to perform the scheduled second side-link communication during the second time-window on the frequency channel.

6. The vehicle system of claim 1, wherein the first air interface uses a first subcarrier spacing and the second air interface uses a second subcarrier spacing that is different from the first subcarrier spacing.

7. The vehicle system of claim 1, wherein the first air interface is a 5G New Radio (NR) air interface.

8. The vehicle system of claim 1, wherein the first air interface is a 4G Long Term Evolution (LTE) air interface.

9. A method, comprising:
scheduling, by a vehicle processing system, a first side-link communication using a first air interface component and a first air interface during a first time-window on a frequency channel, wherein:
 a system resource pool is allocated among multiple different air interfaces such that the first air interface is assigned a first resource pool having the first time-window of the frequency channel;
 a second air interface has a second resource pool having second time-window of the frequency channel;
 the first resource pool and the second resource pool being part of the system resource pool; and
 the vehicle processing system uses a first air interface component that performs side-link communications using a first air interface and a second air interface component that performs side-link communications using a second air interface; and
transmitting, by the first air interface component, the scheduled first side-link communication during the first time-window on the frequency channel, wherein the first side-link communication comprises a basic safety message (BSM) that comprises one or more categories of data selected from the group consisting of: vehicle size data, position data, speed data, heading data, acceleration data, and brake system status data.

10. The method of claim 9, further comprising, receiving, by the vehicle processing system, a resource pool allocation message that defines the first time-window and the second time-window.

11. The method of claim 9, wherein the first side-link communication transmits vehicle data and the vehicle data for the BSM is obtained by a vehicle system interface of a vehicle in which the vehicle processing system is installed.

12. The method of claim 9, further comprising a second side-link communication using the second air interface component and the second air interface during the second time-window on the frequency channel.

13. The method of claim 12, further comprising transmitting, by the second air interface component, the scheduled second side-link communication during the second time-window on the frequency channel.

14. The method of claim 9, wherein the first air interface uses a first subcarrier spacing and the second air interface uses a second subcarrier spacing that is different from the first subcarrier spacing.

15. The method of claim 9, wherein the first air interface is a 5G New Radio (NR) air interface.

16. The method of claim 9, wherein the first air interface is a 4G Long Term Evolution (LTE) air interface.

17. A non-transitory processor-readable medium, comprising processor-readable instructions configured to cause one or more processors of a vehicle processing system to:
schedule a first side-link communication using a first air interface component and a first air interface during a first time-window on a frequency channel, wherein:
 a system resource pool is allocated among multiple different air interface such that the first air interface is assigned a first resource pool having the first time-window of the frequency channel;
 a second air interface has a second resource pool having second time-window of the frequency channel;
 the first resource pool and the second resource pool being part of the system resource pool; and
 the vehicle processing system uses a first air interface component that performs side-link communications using a first air interface and a second air interface component that performs side-link communications using a second air interface; and
cause the first air interface component to transmit the scheduled first side-link communication during the first time-window on the frequency channel, wherein the first side-link communication comprises a vehicle data message that comprises one or more categories of data selected from the group consisting of: vehicle size data, position data, speed data, heading data, acceleration data, and brake system status data.

* * * * *